United States Patent [19]
Dunn

[11] Patent Number: 5,511,624
[45] Date of Patent: Apr. 30, 1996

[54] GUIDING SYSTEM FOR GARDEN TILLER

[76] Inventor: Johnney C. Dunn, 11981 KY HWY 1247, Waynesburg, Ky. 40489

[21] Appl. No.: 260,208

[22] Filed: Aug. 29, 1994

[51] Int. Cl.⁶ .................................................. A01B 45/04
[52] U.S. Cl. ............................ 172/42; 172/26; 280/460.1
[58] Field of Search ............................ 56/16.4 R, 17.2, 56/364; 111/134, 139, 150, 157; 172/26, 42, 43, 112, 114, 125; 280/460.1

[56] References Cited

U.S. PATENT DOCUMENTS

| | | | |
|---|---|---|---|
| 3,098,257 | 7/1963 | Zaha | 280/460.1 X |
| 4,678,042 | 7/1987 | Barton et al. | 172/42 X |

*Primary Examiner*—Terry Lee Melius
*Assistant Examiner*—Robert Pezzuto

[57] ABSTRACT

A turn mechanism for a front end rotable tined garden tiller with the capability of tilling closely to plants with minimal effort. It is comprised of a sturdy main frame, a depth regulator, two connectors with bolt holes in them which is used to connect the mechanism to the tiller, two wheel frames with a tongue on them, a tye bar for connecting the wheel frames together, and a shoulder bolt. When the shoulder bolt is down it locks the wheels in a horizontal line with the tiller and makes them stationary. When the bolt is raised up and a sleeve is pushed under the shoulder of the pin, it unlocks the wheels and by moving the handles to the right or left, the rotable tines can be turned as close to or as far away from the plants being tilled as desired. By moving the handles to the left or right the tiller will turn in a complete circle, making for a smaller turning area.

1 Claim, 2 Drawing Sheets

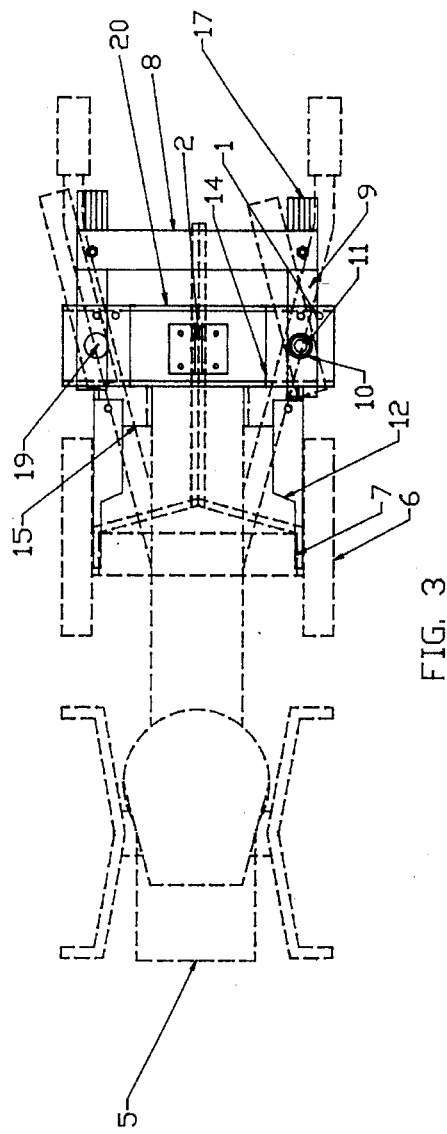
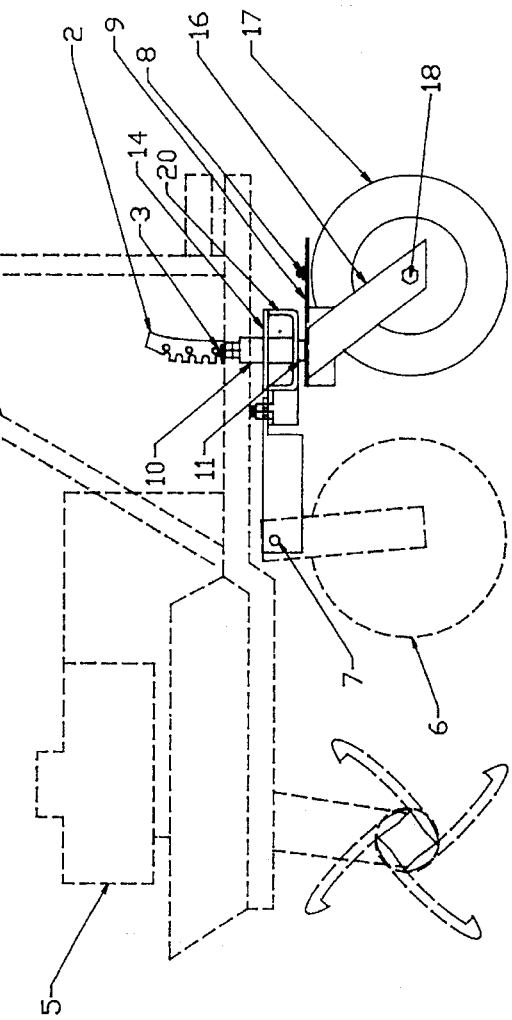
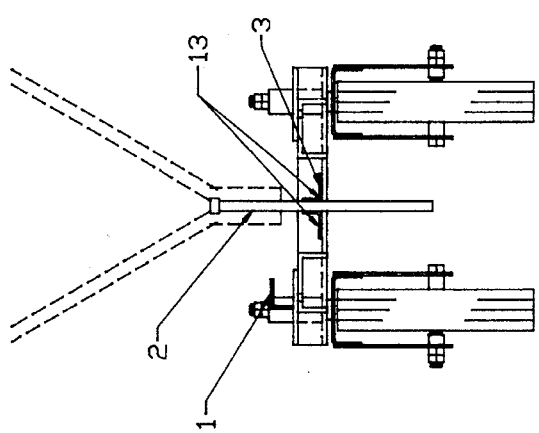

GUIDING SYSTEM FOR GARDEN TILLER

BACKGROUND OF INVENTION

1. Field of the Invention

This invention relates to garden type front end tined rotary tillers, and more particularly to a turn mechanism for such tillers.

2. Description of the Prior Art

The conventional front end tined rotary tiller does a good job of cultivating garden plants but it has stationary wheels in the rear that do not turn. This makes it difficult to guide the tiller if the garden is on a slight slope. The problem is keeping the tiller close enough to the plants on the high side to cultivate them and keeping the tines from cutting into the plants on the lower side.

Another problem is turning the tiller around at the end of the row. With the stationary wheels, the conventional tiller has to be pushed, pulled, shoved or scooted around to change the direction to go back down the next row. This requires the operator to have much physical strength which may prevent a weaker person from being able to operate this type tiller.

SUMMARY OF THE INVENTION

The object of this invention is to replace the stationary wheels on the conventional front end tined garden tiller with a turn mechanism that gives the operator complete control. This mechanism allows the operator to turn this tiller in any direction he wishes to go, even in a complete circle. By moving the handles of the tiller to the right, the tiller will turn to the left and vice-versa. As a result, on ground that is sloping, such as a hillside, the operator can hold the rotable tines up the hill and cultivate the plants as close as desired with minimal effort.

BRIEF DESCRIPTION OF THE DRAWINGS

Many advantages of the invention will be readily appreciated as the same becomes better understood by reference to the accompanying drawing.

FIG. 1, page 2 of 2, is a rear view of the invention which shows the wheels in a horizontal or straight line with the tiller. A stabilizing lock pin, part No. 1, page 2 of 2, of the drawings is seen on the left side of the invention. When the stabilizing pin is drawn, the wheels are locked in, which makes the tiller go in a straight line.

FIG. 2, page 2 of 2, is a right side view showing with hatching lines the old tiller. The Number 5 is the motor of the old tiller. Number 6 is the wheels of the old tiller. Number 4 is a handle attached to the brace of the handles of the old tiller. Numbers 5, 6, and 4 are to be omitted from the patent of this turn mechanism. I am not asking for, nor am I incorporating any part of this old tiller into my invention.

FIG. 3, page 2 of 2, is a top view which shows the motor, number 5, of the old tiller in hatching lines. You can see the wheels, number 6, are disconnected from the frame. This makes room to line the hole, Number 7, in the connecting bar, number 12, with the hole in frame of the old tiller. Putting shoulder bolts in the holes and tightening them, you have connected the turn mechanism to the old tiller. As I said before, I am omitting Numbers 5, 6, and 4 from this patent.

In FIG. 3, page 2 of 2, you can also see by hatching lines, the wheels, part number 17 of the new turn mechanism, cut together to the left. This turns the tiller to the right. By moving the handles of the tiller to the right, the tiller will go to the left. In FIG. 3, page 2 of 2, you can also see the tye bar, part number 8, which connects the two wheel frames together. FIG. 3, page 2 of 2, also shows the tongue on the wheel frame which is part number 9.

FIG. 4, part number 1, page 1 of 2, is the stabilizing pin. I will say more about part number 1 when I get to part number 14.

FIG. 4, part number 2, page 1 of 2, is the depth regulator.

FIG. 4, part number 3, page 1 of 2, is the hole in the depth regulator. (Numbers 4, 5 and 6 are numbers pertaining to ;the old tiller and they are to be omitted from this patent).

FIG. 4, part number 7, page 1 of 2, is a hole in the connecting bars which is part number 12.

FIG. 4, part number 8, page 1 of 2, is the tye bar. It is the means of connecting the wheel frames together.

FIG. 4, part number 9, page 1 of 2, is the wheel frames with the tongues on the back end and a hole drilled in them.

FIG. 4, part number 10, page 1 of 2, is the outside sleeve pressed in a hole in the bottom of part 20, which is the main frame and welded.

FIG. 4, part number 11, page 1 of 2, is a sleeve pressed in the flat top of the wheel frame and welded.

FIG. 4, part number 12, page 1 of 2, is the connectors with a hole in each end. This is the means of connecting the new turn mechanism to the tiller.

FIG. 4, part number 13, page 1 of 2, is the base that holds the depth regulator and is bolted or welded to the bottom of part number 20 which is the main frame.

FIG. 4, part number 14, page 1 of 2, is the caps with a hole drilled in them and placed over the sleeves on part number 10, page 1 of 2. This is welded to part number 20, which is the main frame, stabilizing the sleeve, by squaring the wheel frame, number 9, with number 20, the main frame, and drilling a hole straight through part number 14, part number 20 and part number 9. Then by using a pin with a shoulder on it, you drop the pin in the hole and you have a stabilized turn mechanism. With the wheels locked in a straight line with the rotable tines and raising the pin, number 1, and pushing a slide under the shoulders on the pin, you unlock the turn mechanism. Now you can steer the tiller to the right or to the left, keeping the rotable tines as close to or as far away from the plants or vegetables as you wish. If your garden is on a slight hillside, you can steer the wheels down the hill and keep the rotable tines up the hill as close to your plants as you wish. Also, by pushing the handles as far to the left as you can, you turn the tiller in a complete circle. You can turn the tiller to the right or left making for a much smaller turning space needed than for other tillers.

FIG. 4, part number 15, page 1 of 2, is two nubs with a bolt hole in top of each, welded to the flange on the front of part number 20, which is the main frame.

FIG. 4, part number 16, page 1 of 2, is a short strip of metal with an angle on each end with a wheel bolt hole in each end. The other end is welded at an angle to the flange on part number 9 creating a lay back wheel frame with a tongue on the back of it.

FIG. 4, part number 17, page 1 of 2, is the wheels of the turn mechanism.

FIG. 4, part number 18, page 1 of 2, is the bolts and nuts that hold the wheels in the wheel frames.

FIG. 4, part number 19, page 1 of 2, is the bolts, washers and nuts that hold the wheel frame together.

FIG. 4, part number 20, page 1 of 2, is the main frame.

DESCRIPTION OF THE PREFERRED EMBODIMENTS

Figure 4:
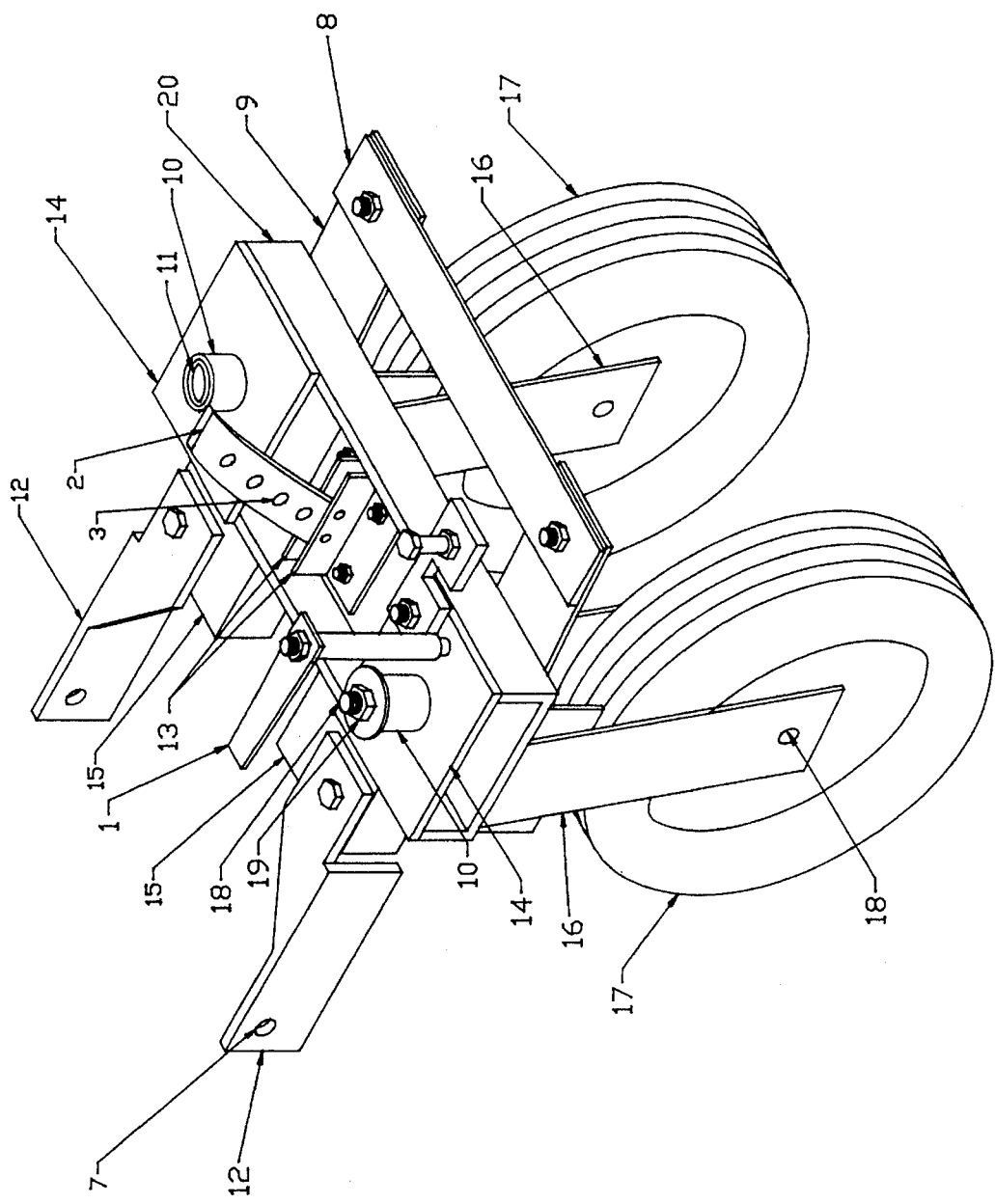
FIG. 4, page 1 of 2, is a perspective view that you can look at and see exactly what the invention looks like and how it is assembled. You can also see each number and every part of the guiding system.

FIG. 4 illustrates a perspective view of the turn mechanism for a front end rotary tiller used for gardening. It replaces the conventional wheel frame. It consists of a sturdy main frame 20 made of channel steel with a flange on each side and two holes drilled in the bottom near each end. Two sleeves 10 made of a steel pipe are pressed into the holes and welded in the channel of the main frame 20. Two caps 14 with a drilled hole in them are placed over the sleeves 10 and welded to the flanges on the main frame 20. The caps 14 give strength to the sleeves 10. There are two nubs 15 made from a piece of channel steel and attached to the flanges on the front side of the main frame 20. There is a base 13 centered in the channel of the main frame 20 and holds the depth regulator 2 which is the means of regulating how deep you cultivate the soil. There are two lay back wheel frames 9 in each turn mechanism. Each wheel frame 9 has a flat top on it and a hole centered and drilled in each. A short sleeve 11 made of a steel pipe is pressed in them and welded from the bottom. There is a tongue formed on the back end of each wheel frame 9 with a drilled hole near the end of it. There are two metal strips 16 centered on the flange of the wheel frame 9 and welded at an angle with a wheel 17 bolt hole in each, creating a lay back wheel frame 9. The sleeves 11 in the wheel frame 9 are slightly longer the sleeves 10 in the main frame 20. The sleeves 11 in the wheel frame 9 have a slightly smaller O.D. than the I.D. of the sleeves 10 in the main frame 20. When the sleeves 11 are inserted into the sleeves 10 in the main frame 20 by pushing a bolt up through the hole in the sleeve 11 in the wheel frame, 9 putting a washer and nut on the bolt and tightening the nut, putting a wheel 17 in the wheel frames 9 and connecting the tye bar 8 to the tongue on the wheel frame 9 you have synchronized the wheels 17 in the turn mechanism. This; makes the wheels move and turn in sequence. When the wheels 17 are cut so far the rye bar 8 hits the main frame 20 and stops the wheels 17 from cutting so far they will not cut back the other way. There is also a stabilizing pin 1 in this turn mechanism which is formed by squaring the wheel frame 9 with the main frame 20 and drilling a hole straight down through the caps 14, the bottom of the main frame 20, the top of the wheel frame 9 and putting a shoulder bolt in the hole. Now you have a stabilized turn mechanism. (The shoulder bolt is what I call the stabilizing pin.) With the wheels locked in a straight line with the rotable tines and by raising the pin 1 and pushing a slide under the shoulders on the pin I you unlock the turn mechanism. Now you can steer the tiller to the right or left straight ahead or in a complete circle. By attaching the connections 12 to the nub 15 on the main frame 20 you are ready to connect the turn mechanism to the rotable tined tiller.

What I claim is:

1. A replacement fixably pivotal wheel assembly for use with a front tined rotating garden tiller, the wheel assembly comprising:

a main frame having a front and a rear portion;

two fixably attached mounting members, each mounting member having a first and second end, the first end of each mounting member being secured perpendicular to the front portion of said main frame;

a pair of pivot holes defining a pivot axis through each mounting member adjacent to the second end of each mounting member wherein each mounting member is attached through the use of said pivot holes to a replaced wheel mounting position on the front tined rotating garden tiller;

a caster wheel assembly comprising two caster wheels wherein each caster wheel is pivotally attached to a backward-swept mounting bracket and wherein each mounting bracket is pivotally attached to both said main frame and a spacing member, the spacing member being situated to the rear of the main frame and attached to a tongue member rearly extending from each mounting bracket thereby maintaining a predetermined spacing and relative angle between said two caster wheels;

a depth regulator assembly comprising two opposing L-shaped members secured substantially at a longitudinal mid-point of said main frame and an arcuate member slidably, adjustably situated between the said two opposing L-shaped members and a stabilizing pin, slidably situated on a vertical axis through the main frame thereby being selectively engageable with the caster wheel assembly.

* * * * *